(12) United States Patent
Sharma et al.

(10) Patent No.: US 8,271,525 B2
(45) Date of Patent: Sep. 18, 2012

(54) APPARATUSES, METHODS AND SYSTEMS FOR A SMART ADDRESS PARSER

(75) Inventors: Nityanand Sharma, Tampa, FL (US); Sutap Chatterjee, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 524 days.

(21) Appl. No.: 12/576,330

(22) Filed: Oct. 9, 2009

(65) Prior Publication Data

US 2011/0087839 A1    Apr. 14, 2011

(51) Int. Cl.
*G06F 17/30* (2006.01)
(52) U.S. Cl. .................. 707/771; 707/780; 707/708
(58) Field of Classification Search ............. 707/771, 707/708, 780
See application file for complete search history.

(56) References Cited

U.S. PATENT DOCUMENTS

| | | | | |
|---|---|---|---|---|
| 7,693,853 | B2* | 4/2010 | Bellamy et al. | 707/733 |
| 7,818,333 | B2* | 10/2010 | Biard et al. | 707/763 |
| 8,150,547 | B2* | 4/2012 | Wojdyla et al. | 700/227 |
| 2005/0021551 | A1* | 1/2005 | Silva et al. | 707/102 |
| 2006/0276916 | A1* | 12/2006 | Dearing et al. | 700/79 |
| 2009/0077077 | A1* | 3/2009 | Geldenbott et al. | 707/6 |
| 2009/0198954 | A1* | 8/2009 | Sanders | 711/212 |
| 2009/0204783 | A1* | 8/2009 | Lyle et al. | 711/202 |
| 2010/0223294 | A1* | 9/2010 | Winslow | 707/780 |
| 2010/0281020 | A1* | 11/2010 | Drubner | 707/722 |

* cited by examiner

*Primary Examiner* — Debbie Le

(57) ABSTRACT

The apparatus, methods and systems for a smart address parser (hereinafter, "SAP") described herein implement a text parser whereby users may enter a text string, such as manually via an input field. The SAP processes the input address string to extract address elements for storage, display, reporting, and/or use in a wide variety of back-end applications. In various embodiments and implementations, the SAP may facilitate: separation and identification of address components regardless of the order in which they are supplied in the input address string; supplementation of missing address information; correction and/or recognition of misspelled terms, abbreviations, alternate names, and/or the like variants of address elements; recognition of unique addresses based on minimal but sufficient input identifiers; and/or the like.

3 Claims, 9 Drawing Sheets

APPARATUSES, METHODS AND SYSTEMS FOR A SMART ADDRESS PARSER

BACKGROUND

With the advent of inexpensive and ubiquitous computing abilities and the wide information dissemination capabilities of the Internet, more and more information has been encoded into electronic form and made available to the public. Among such information are geographic data, residential listings, business listings, and the like. Recently, some facilities have come about allowing users to search for a location, a business, or an individual by entering an address into a search field. For example, mapping tools exist that allow a user to enter an address and retrieve, in response, a map at or near that address, possibly including a display of nearby points of interest, businesses, or other addresses.

BRIEF DESCRIPTION OF THE DRAWINGS

The accompanying appendices and/or drawings illustrate various non-limiting, example, inventive aspects in accordance with the present disclosure.

Figure 1:
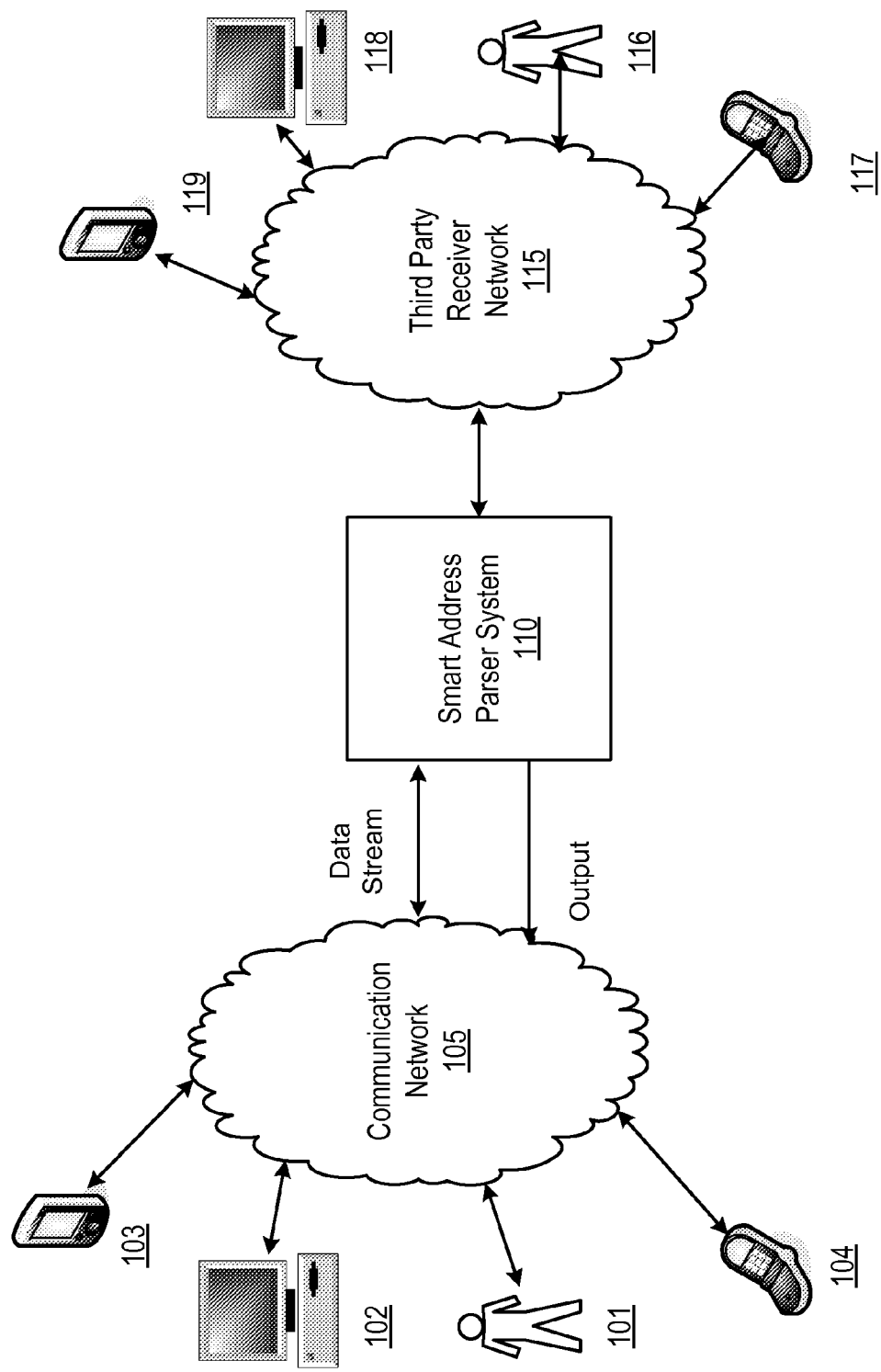
FIG. 1 shows a block diagram illustrating data flow among and between Smart Address Parser (hereinafter "SAP") components and/or affiliated entities in one embodiment of SAP operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

SAP

This disclosure details the implementation of apparatuses, methods and systems for improving the ability of a text parser to parse data components that may not be otherwise recognized as such. The APPARATUSES, METHODS AND SYSTEMS FOR A SMART ADDRESS PARSER (hereinafter, "SAP") described herein implement a text parser whereby users may enter a text string, such as manually via an input field. The SAP can then process the input address string to extract address elements for storage, display, reporting, and/or or use in a wide variety of back-end applications. In various embodiments and implementations, the SAP may facilitate: separation and identification of address components regardless of the order in which they are supplied in the input address string; supplementation of missing address information (e.g., the SAP may recognize that the term "Drive" is missing from the input string "Tampa Florida 7000 Terrace Ridge APT A Floor 3"); correction and/or recognition of misspelled terms, abbreviations, alternate names, and/or the like variants of address elements; recognition of unique addresses based on minimal but sufficient input identifiers (e.g., if "7000 Chinaberry Drive" is unique in the United States, the SAP may discern the city, state, zip code, and/or the like associated with it); and/or the like.

In one embodiment, an address parsing processor-implemented method is disclosed, comprising: receiving an input address string comprising a plurality of address component inputs; formatting the input address string into an input address array, wherein each element of the input address array contains one address component input; performing by the address parsing processor at least one serially telescoping search on the input address array; identifying by the serially telescoping search at least one address component input matching a stored address component; parsing out the identified address component input from the input address array; and providing the parsed identified address component.

In another embodiment, an address-parsing processor-implemented method is disclosed, comprising: reading a list of states, including corresponding state variants, from a state database into a cached state array; receiving an input address string; trimming spaces from ends of the input address string; replacing each instance of punctuation in the input address string with a space; replacing each instance of multiple adjacent spaces in the input address string with a single space; splitting the input address string by the single space delimiters into a plurality of address components; associating each of the plurality of address components with an element of an input address array; locating at least one input address array state element corresponding to a matching state from the cached state array by a serially telescoping state search; recording the matching state; dropping the at least one input address array state element from the input address array; reading a list of cities associated with the matching state, including corresponding city variants, into a cached city array; locating at least one input address array city element corresponding to a matching city from the cached city array by a serially telescoping city search; recording the matching city; dropping the at least one input address array city element from the input address array; reading a list of streets associated with the matching city and the matching state, including corresponding street variants, into a cached street array; locating at least one input address array street element corresponding to a matching street from the cached street array by a serially telescoping street search; recording the matching street; dropping the at least one input address array street element from the input address array; reading a list of street prefixes and street suffixes associated with the matching street into the cache; comparing the list of street prefixes and street suffixes with the input address array to identify any matching street prefixes and street suffixes; searching the input address array for a numerical element; recording the numerical element as a house address; dropping the numerical element from the input address array; and providing the matching state, matching city, matching street, and the house address.

It is to be understood that, depending on the particular needs and/or characteristics of an SAP user, input facility, address type, administrator, data files, servers, data payload, monetization model, hardware configuration, network framework, and/or the like, various embodiments of the SAP may be implemented that enable a great deal of flexibility and customization. The instant disclosure discusses embodiments of the SAP primarily within the context of user entered address-related text strings provided via a website or application on a computer. However, it is to be understood that the SAP described herein may be readily configured/customized for a wide range of other applications or implementations. For example, aspects of the SAP may be adapted for non-address searches, applications or web-based usage with wireless user handsets, portable mobile devices, GPS devices or applications, computer-based searches, automatic string submission, multi-dimensional input parsing, audio and/or speech recognition, optical character recognition, and parsing applications, electronic address analysis, and/or the like. It is to be understood that the SAP may be further adapted to other implementations and/or applications that analyze queries and/or return search results. The SAP may also be further adapted to other implementations and/or applications that process or use the results in any number of ways. In some non-limiting examples, the results may be used to print address labels, store and organize address lists, generate geographic searches and/or residential/business listings, find a location with global-positioning-system equipped device, navigate to the location, and/or the like. The SAP provides enhanced data mining capabilities and specific domain knowledge for better functionality where a user enters information in any order and even in traditionally unrecognizable character sets. This SAP can, among other things, separate address components even if they are not entered in the standard address format, find information that is missing from the entered information, correct spelling mistakes, and recognize unique addresses.

FIG. 1 shows a block diagram illustrating data flow among and between SAP components and/or affiliated entities in one embodiment of SAP operation. In FIG. 1, a user 101 is shown entering a text string that is transmitted via a communications network 105 to an SAP system 110. The user may employ a wide variety of different communications devices within various embodiments of SAP operation. For example, in one embodiment, devices such as an internet protocol (IP) enabled telephone 104, Verizon Fiber Optic Service (FiOS) television, a personal computer (PC) 102, PDA 103 or other IP-enabled communications devices, and/or the like may be employed. In another embodiment of the SAP, mobile phones, handheld computers or GPS devices may be employed by users and engaged by SAP facilities and/or services. These or other devices can allow a user to speak, write, text or otherwise transmit his or her input. Further, these or other devices may be automated or preprogrammed to provide input to the communication network 105 or they may download the information from a phonebook or other source. Additionally, a third party receiver network 115 may receive output or transmit input into the SAP system 110. When the third party receiver network 115 receives output from the SAP system 110, it can be used in a variety of ways. For example, in some embodiments, the third party receiver network may communicate with a GPS device, address storage or labeling systems, networks that compile or analyze statistics, voter information, and/or the like. In some example embodiments, this information can be returned to a user 116, an internet protocol (IP) enabled telephone 117, Verizon Fiber Optic Service (FiOS) television, a personal computer (PC) 118, PDA 119 or other IP-enabled communications devices, and/or the like.

Figure 2:
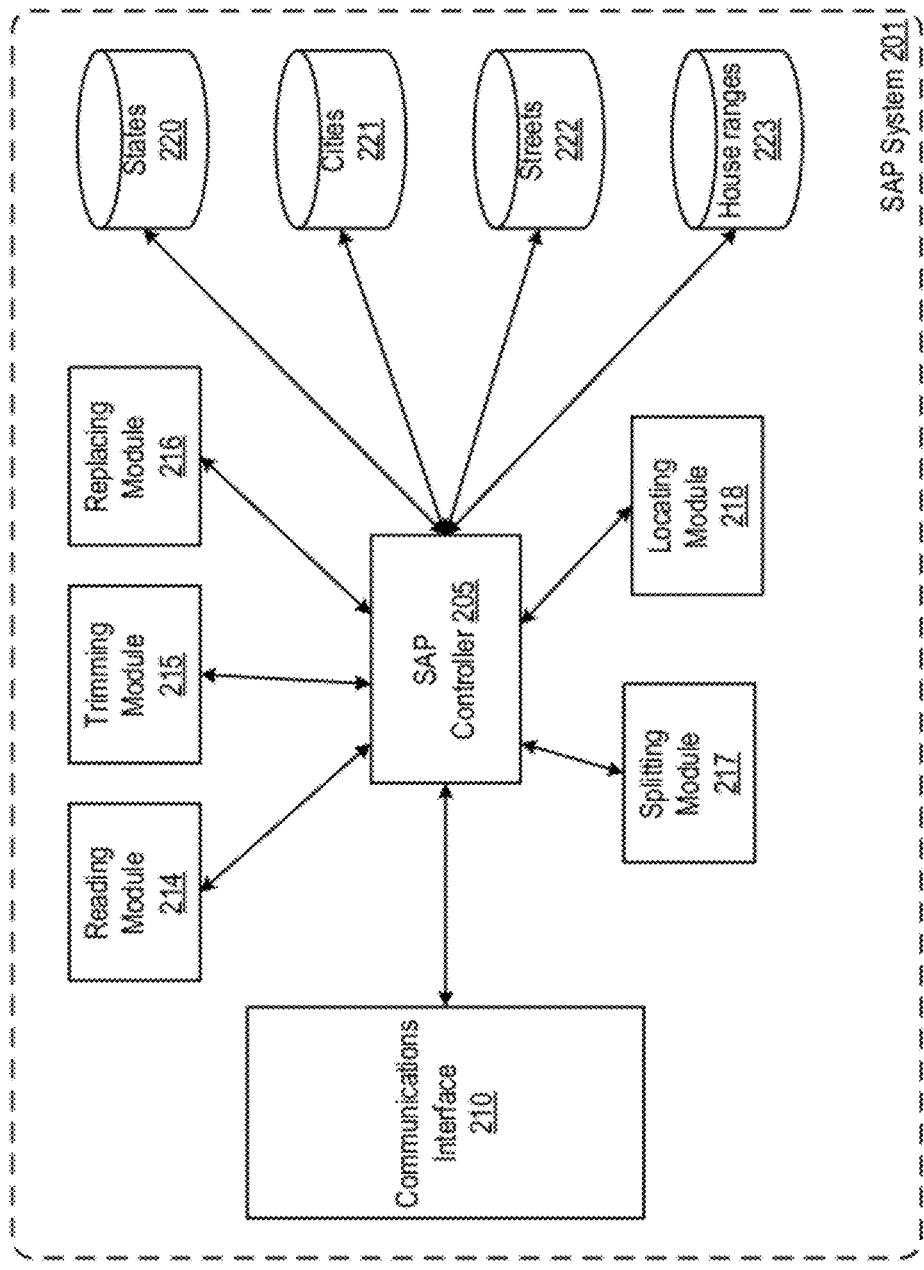
FIG. 2 shows aspects of data flow between and among SAP components in one embodiment of SAP operation.

FIG. 2 shows an implementation of SAP components in one embodiment of SAP operation. The SAP system 201 may contain a number of modules and/or data stores. An SAP controller 205 may serve a central role in some embodiments of SAP operation, serving to orchestrate the reception, generation, and distribution of data and/or instructions, to, from, and between SAP modules and/or mediate communications with external entities and systems.

In one embodiment, the SAP controller 205 may be housed separately from other modules and/or databases within the SAP, while in another embodiment, some or all of the other modules and/or databases may be housed within and/or configured as part of the SAP controller. Further detail regarding implementations of SAP controller operation, modules, and databases is provided below.

In the implementation illustrated in FIG. 2, the SAP controller 205 may be configured to couple to external entities via a communications interface 210. The communications interface may, for example, configure data received from the SAP controller 205 and/or any of a variety of external entities for receipt and/or transmission to other entities and/or SAP components. In various implementations, a communications interface 210 may, for example, serve to configure data into application, transport, network, data link, and/or physical layer formats in accordance with a TCP/IP communications model. The communications interface 210 may further be configurable to implement and/or translate SIP, SIP CPE, VOIP, and/or the like data formats and/or protocols. The communications interface 210 may further house one or more ports, jacks, antennas, and/or the like to facilitate wired and/or wireless communications with and/or within the SAP. In one implementation, the communication interface 210 may further comprise a microphone, audio codec, speech-recognizer, and/or the like components facilitating the reception and analysis of audio data, speech, and/or the like for analysis by SAP components. In another implementation, the communication interface 210 may comprise an optical camera, optical character recognition component, and/or the like to facilitate automatic input and analysis of printed and/or other documentary data.

In one implementation, the SAP controller 205 may further be coupled to a plurality of modules configured to implement SAP facilities and/or services. A reading module 214 may, in one implementation, be configurable to receive and/or process information from the databases or information input by a user. For example, it may read an input string entered by a user or a list of states in a database. The reading module 214 may, in one implementation, read a list of all the states and their corresponding alternate names from the state database 220 into a cache array (state_array). Further the reading module 214 may also read a list of all cities in a state and their corresponding alternate names (cities_in_state_array) from the city database 221. The reading module 214 may also read a list of all streets within the city and state from the street database 222 based on the city and state previously read and cached and may cache this information as well (street_city_state_array). The reading module may apply a similar technique for each street type, street prefix and street suffix read from a streets database 222. Additionally, the reading module 214 may read a list of all valid house number ranges and sublocations like apartment numbers and/or the like for every street, city and state cached above from the house ranges database 223 and put this information in cache (house_ranges_for_street_city_state_array).

The trimming module 215 may be configurable to process received information into one or more formats suitable for SAP analysis. For example, in one implementation, the trimming module may trim white spaces from the beginning and end of an input string. The replacing module 216 may, in one implementation, be configurable to replace extraneous punctuation from the input string so it may be parsed more effectively. In one example, the replacing module may replace a comma with a space and may replace a series of spaces with a single space. In one example embodiment, the splitting module 217 will split the input string into an array using the spaces in the trimmed and replaced string as delimiters to distinguish the elements of the array thereby creating an address string array that may be used to locate the various address components for comparison with the lists contained in the databases 220-223.

In one example embodiment, the locating module 218 may locate the address components in the address_string_array. For example, the locating module may first seek to identify the state element of an input string. An element may be selected that is most probably the state element (most_probable_state_element). For example, in one implementation, the locating module may check for the state in the last element of the array as the most_probable_state_element. The element that will be checked for state will be called the most_probable_state_element as the array is traversed. The contents of the most_probable_state_element may then be compared to elements of the cached state_array. If the contents of the most_probable_state_element are found among the contents of the state_array the element may be marked as a state and dropped from the array. If the most_probable_state_element is not found among the states in the cached state_array, the locating module may attempt an approximate match, such as by checking if the string element matches a derivative, alternate name or misspelling of a state contained in the state_array, or if the string element otherwise has characteristics of a legitimate state name (e.g., if it has the correct number of letters). If an approximate match is found, the element may be marked as a state and dropped from the array. If the most_probable_state_element is not found by the approximate match, the element of the address_string_array preceding the most_probable_state_element may be appended to the most_probable_state_element and the combination may be checked for direct or approximate matches against elements of the cached state_array. If no match is found, the SAP may append further elements and perform searches on the resulting combinations until either a match is found or a maximum number (e.g., five) total string elements have been appended together with no successful match. In one implementation, if an alphanumeric element (e.g., an element whose contents include both alphabetical and numerical characters) is found among the appended string elements, the SAP may recognize that the combination of elements is not a valid state and cease appending further elements to the combination. If no match is found to any combination of string elements generated as described, the SAP may proceed to the next element in the string, labeling it as the most_probable_state_element, and repeating the steps of searching and appending above until either a match is found or all of the elements of the input string have been analyzed. If all string elements have been traversed and no match to a state in the state_array is found, the address string may be marked as a bad string, an error message generated, and/or the like.

If a state is successfully identified in the input string, the SAP may generate and/or cache a list of all cities, along with their derivatives, alternate names, misspellings, and/or the like that are associated with that matched state in the cities database 221 and/or a cached array of cities. In one implementation, associations between database elements such as cities, states, street names, and/or the like may be realized as keys connecting database tables. The locating module 218 may seek to identify a city element among the input string elements, such as by a method similar to that described above to identify the state element. For example, the SAP may identify a most probable city element, calling it most_probable_city_element. In one example embodiment the locating module may check for the city in the last element of the array as the most_probable_city_element. The element that will be checked for city will be called the most_probable_city_element as the array is traversed. The contents of the most_probable_city_element may then be compared to the cached cities_in_state_array. If the most_probable_city_element is found in the cities_in_state_array the element may be marked as a city and dropped from the array. If the most_probable_city_element is not found, the locating module may check if the string element is a derivative, alternate name, misspelling, and/or the like of a city, such as those listed in the cities_in_state_array. If a approximate match is found, the element may be marked as a city and dropped from the array. If the most_probable_city_element is not found, the element of the address_string_array preceding the most_probable_city_element may be appended to the most_probable_city_element and the combination may be checked for direct or approximate matches against elements of the cached cities_in_state_array. If no match is found, the SAP may append further elements and perform searches on the resulting combinations until either a match is found or a maximum number (e.g., five) of total string elements have been appended together with no successful match. In one implementation, the SAP may determine an input address array length and set the maximum number of total string elements as the length, a derivative of the length, and/or the like based on desired criteria. In one implementation, if an alphanumeric element is found among the appended string elements, the SAP may recognize that the combination of elements is not a valid city and cease appending further elements to the combination. If no match is found to any combination of string elements generated as described, the SAP may proceed to the next element in the string, labeling it as the most_probable_city_element, and repeating the steps of searching and appending above until either a match is found or all of the elements of the input string have been analyzed. If all string elements have been traversed and no match to a city in the cities_in_state_array is found, the address string may be marked as a bad string, an error message generated, and/or the like.

In the example where a city and state are identified, the SAP may generate and/or cache a list of all street names, along with their derivatives, alternate names, misspellings, and/or the like, that are associated with that city and state in the streets database 222. The locating module 218 may seek to identify a street element among the input string elements, such as by a method similar to that described above to identify the state and city elements. For example, the SAP may identify a most probable street element, the element that is most probably the street name element, and call it most_probable_street_element. In one example embodiment the locating module may identify the last element of the input array as the most_probable_street_element. The element that will be checked for street will be called the most_probable_street_element as the array is traversed. The contents of the most_probable_street_element may then be compared to the cached street_city_state_array. If the most_probable_street_element is found in the street_city_state_array the element may be marked as a street and dropped from the array. If the most_probable_street_element is not found, the locating module may determine if the string element is a derivative, alternate name, misspelling and/or the like of a street, such as those listed in the street_city_state_array. If a approximate match is found, the element may be marked as a street and dropped from the array. If the most_probable_street_element is not found, the element of the address_string_array preceding the most_probable_street_element may be appended to the most_probable_street_element and the combination may be checked for direct or approximate matches against elements of the cached street_city_state_array. If no match is found, the SAP may append further elements and perform searches on the resulting combinations until either a match is found or a maximum number (e.g., five) total string elements have been appended together with no successful match. In one implementation, if an alphanumeric element is found among the appended string elements, the SAP may recognize that the combination of elements is not a valid street and cease appending further elements to the combination. In some implementations, alphanumeric elements may be allowed for input street name components (e.g., East 42nd Street). If no match is found to any combination of string elements generated as described, the SAP may proceed to the next element in the string, labeling it as the most_probable_street_element, and repeating the steps of searching and appending above until either a match is found or all of the elements of the input string have been analyzed. In one implementation, if all string elements have been traversed and no match to a street in the street_city_state_array is found, the address string may be marked as a bad string, an error message generated, and/or the like. In an alternate implementation, the SAP may accept a lack of street name in an input address string and proceed with only a city and state parsed from the string.

When a street name has been identified, the SAP may get one or more prefixes and/or suffixes from the cache. The locating module 218 may compare contents of the address_string_array to cached prefixes and/or suffixes and, if found, may note the match and drop them from the array.

The locating module 218 may also search for a house number in the input address string. In one implementation, the locating module 218 may begin by checking the first element of the address_string_array. If it is numeric, it may be marked as a house number and dropped from the address_string_array. If not, the locating module 218 may traverse each other element of the address_string_array until a numerical element is found or all elements have been traversed.

The SAP may further seek to identify any existing sublocations in an input address string. In one implementation, the locating module 218 may load a list of all possible sublocations obtained from the house ranges database 223, such as into cache. The locating module 218 may then loop through elements of the remaining address_string_array to check for matches to any of the cached sublocations. If a match is found it may be marked as a sublocation, the element next to it as the value of the sublocation, and/or the like. These elements may then be dropped from the address string array.

The above description pertains to a particular embodiment of SAP operation. Other implementations and/or embodiments are also contemplated as being within the scope of SAP operation. For example, the process discussed above may be applied to and/or in conjunction with additional elements and databases including zip codes, telephone numbers, electronic addresses, post office boxes, and/or the like elements. Further details illustrating logic flow in embodiments of SAP operation are provided below with relation to FIGS. 3-8.

In analyzing input address strings, the SAP may access address information such as those stored in databases 220, 221, 222 and 223 shown in FIG. 2. These databases may include: a list of all states and their corresponding alternate names (e.g., a District of Columbia entry may include DC, D.C., District of Columbia, D.C., and/or other variants, abbreviations, misspellings, and/or the like); a list of all state corresponding cities (e.g., all cities in a state, stored in association with that state) and their corresponding alternate city names; a list of all state and city corresponding streets and alternate street names; a list of all possible street types, sublocation types, and/or the like; a list of all street prefixes; a list of all street suffixes; a list of valid house ranges for every street/city/state combination; and/or the like. Further lists may include zip codes, phone numbers, apartment numbers, post office box numbers, electronic address information, and/or the like. Most or all of this information may be obtained, for example, by downloading from online sources such as phone books, address lists, electronic maps, GPS maps, and/or the like, may be preprogrammed, obtained by data entry, and/or the like. The collected information may then be organized into lists in the database based on the type of data represented. The lists may be stored as well as the relational information that associates the information.

Figure 3:
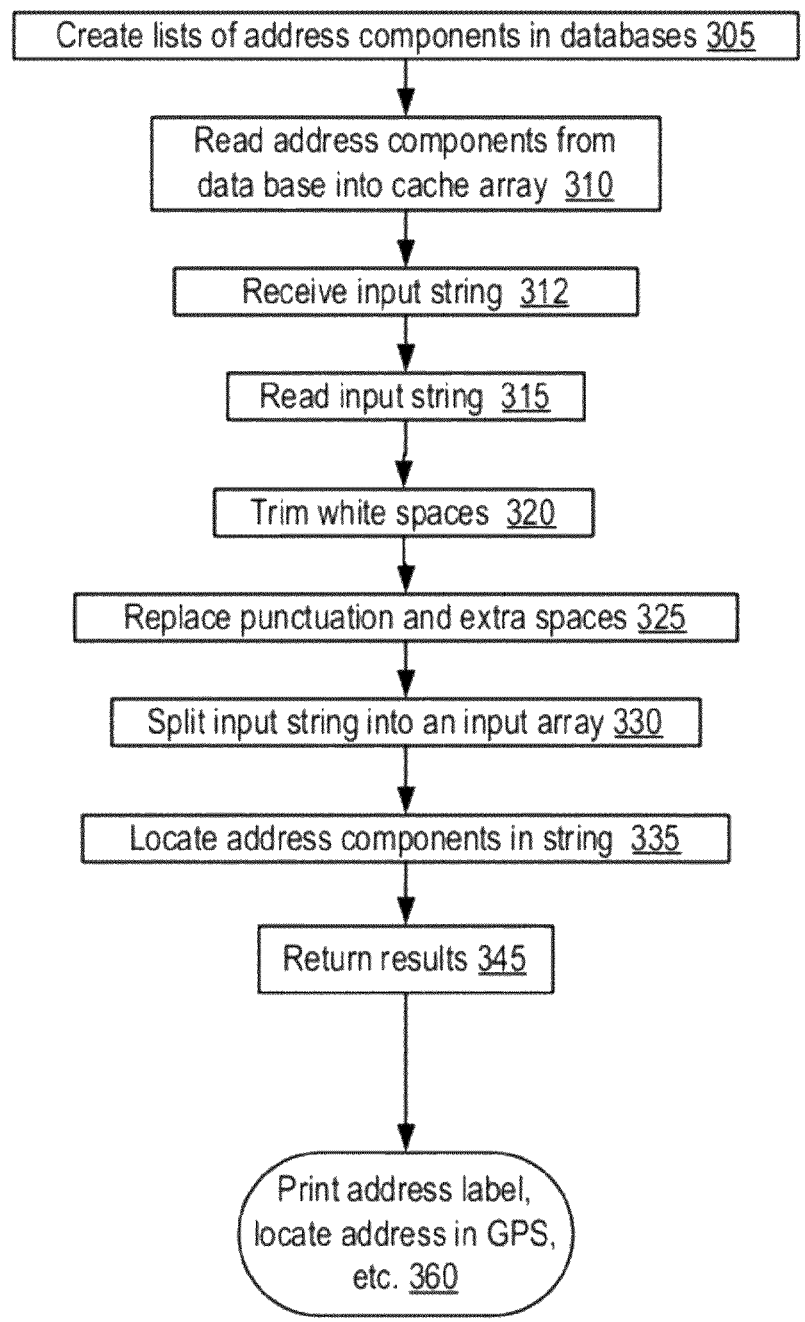
FIG. 3 shows an implementation of overall logic flow in one embodiment of SAP operation.

FIG. 3 shows an implementation of overall logic flow in one embodiment of SAP operation. Lists of address components are created in databases 305. These lists may also include derivatives, alternate names, misspellings, and/or the like of components as well as relationships between the components. For example, a city may be associated with one or more states having cities with the same name, street names may be associated with the cities and states in which streets having that street name exist, house number ranges may be associated with streets, cities and states having those house number ranges, and/or the like. These relationships may be used, in some implementations, to determine a complete address and/or one or more possible complete addresses (e.g., from which a user may select) from a particular incomplete input address. For example, if a particular street name is unique to a particular city and state, then the SAP may discern the city and state based only on the street name and/or some combination of less than all usual address components. Address components may be read from databases into a cache array 310, and an input address received 312, such as from a user, mobile device, personal computer, telephone, network connection, speech recorder, document reader, and/or the like. In one implementation, the input address may be received at the SAP via an Apache Web server application programming interface (API) command and/or a pipe message. The Apache Web server may provide a webpage and/or web service interface to an end user entering address information relayed by the server to the SAP system. The received string may be read by the SAP 315, and white spaces of the read input string, such as empty spaces leading and/or trailing the text content, may be trimmed 320. The SAP may also replace punctuation, such as commas, and multiple spaces with single spaces 325. These single spaces may then be used as delimiters to split the input string into an array 330. This array may then be analyzed to locate, identify, and/or otherwise discern one or more address components 335, which is described in further detail below. Results obtained from the location of address components at 335 may be returned 345 and/or used for a variety of output applications, such as, but not limited to: printing address labels; creating, generating or organizing address lists; finding a location on a map and/or providing directions; performing a search of residential and/or business information; and/or the like 360. In one implementation, the SAP may be applied to a large volume of user freeform-input addresses to convert them into formats usable by back-end applications.

Figure 4:
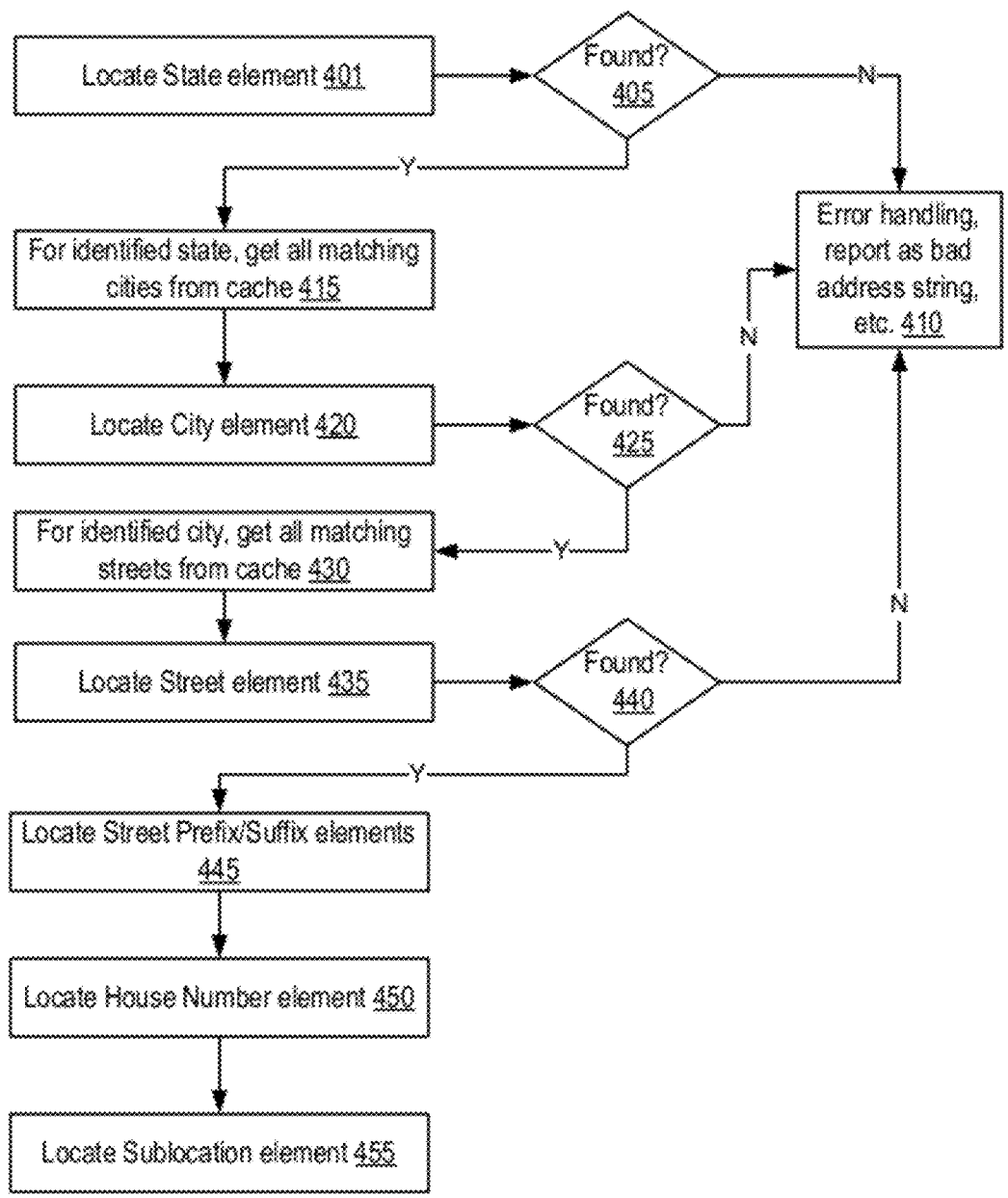
FIG. 4 shows an implementation of logic flow for address element location in one embodiment of SAP operation.

FIG. 4 shows an implementation of logic flow for address element location in one embodiment of SAP operation. In one embodiment, the SAP may undertake the logic flow shown in FIG. 4 at 335 in FIG. 3 to discern address values contained in an input address string. It should, however, be understood that other varieties of logical flow than that shown are contemplated as being within the scope of embodiments of SAP operation, such as may include different steps, orders and/or topologies, data searches and/or analyses (e.g., zip codes, telephone numbers, etc.), and/or the like. In the illustrated implementation, the SAP may locate a state element in the input address string 401. In one implementation, the SAP may undertake a serially telescoping search such as that shown, in one implementation, in FIG. 5, for locating the state element. A determination may be made as to whether any state has been found 405. If not, then an error handling procedure may be undertaken 410, such as marking the input as a bad address string, providing an error message, requesting reentry of the input, and/or the like. If a state is determined to have been identified at 405, then the SAP may proceed to 415 to find all cities corresponding to the identified state, such as from a city database and/or from a cached list of cities. The SAP may then locate a city element in the input address string based on the cities found to correspond to the identified state 420. In one implementation, the SAP may undertake a serially telescoping search such as that shown, in one implementation, in FIG. 5, for locating the city element. A determination may be made as to whether a city has been found 425 and, if not, then an error handling procedure may be undertaken, the input string marked as a bad string, and/or the like 410. If a city is determined to have been found at 425, the SAP may get a list of all street names matching the identified city and/or state from a database and/or cache 430. The SAP may then locate a street element in the input address string based on the streets found to correspond to the identified city and/or state 435. In one implementation, the SAP may undertake a serially telescoping search such as that shown, in one implementation, in FIG. 5, for locating the street element. A determination may be made as to whether a street has been found 440 and, if no, then an error handling procedure may be undertaken 410. If a street is determined to have been found at 440, the SAP may seek to identify street prefixes and/or suffixes 445 (e.g., prefixes such as north, south, east, west, via, and/or the like; suffixes such as street, avenue, lane, court, parkway, highway, and/or the like; and abbreviations, variants, misspellings, and/or the like thereof). In one implementation, the SAP may undertake a search similar to that shown, in one implementation, in FIG. 6 for locating the prefix and/or suffix element(s). In one implementation, the SAP may query and/or cache street prefixes and/or suffixes associated in the database with the street name, city and/or state previously identified by the SAP in the input address string. The SAP may then seek to identify a house number element in the input address string 450. In one implementation, the SAP may undertake a search similar to that shown, in one implementation, in FIG. 7 for locating the house number element. In one implementation, the SAP may query and/or cache house number ranges associated in the database with previously identified address information, such as the street name, city, state, and/or the like, and only admit an input address string element as a house number element if it is determined to fall within that range. The SAP may then seek to identify any sublocation elements in the input address string 455, such as, but not limited to: apartment and/or apartment number, letters appended to a house number, and/or the like. In one implementation, the SAP may undertake a search similar to that shown, in one implementation, in FIG. 8 for locating sublocation elements in the input address string.

Figure 5:
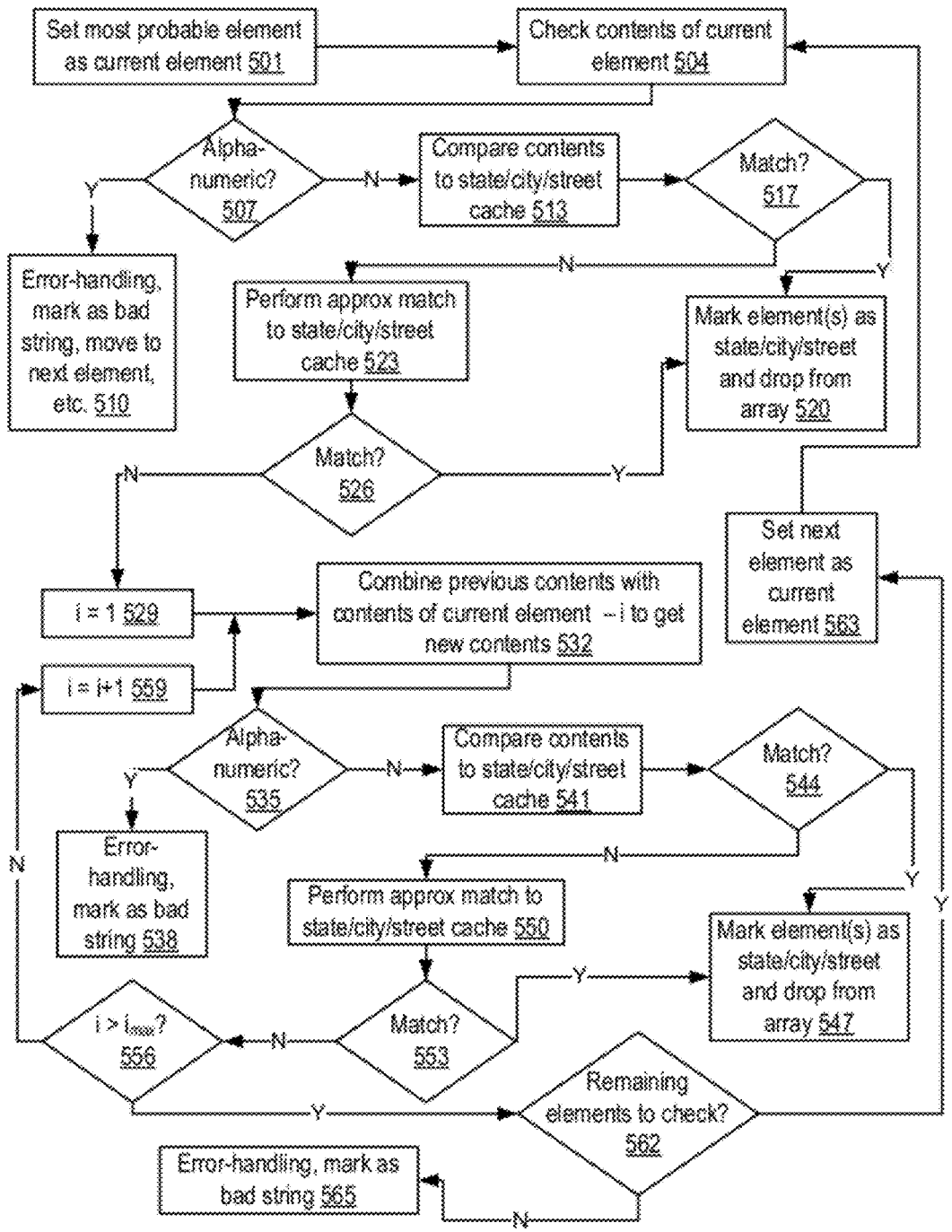
FIG. 5 shows an implementation of logic flow for serially telescoping address element searching in one embodiment of SAP operation.

FIG. 5 shows an implementation of logic flow for serially telescoping address element searching in one embodiment of SAP operation. The implementation of serially telescoping address element search shown in FIG. 5 may be employed to identify any of a variety of address elements individually and/or in combination, such as state, city, street, and/or the like. In some implementations, particular steps and/or elements of the flow shown in FIG. 5 may be omitted, modified and/or supplemented depending on the particular requirements of the address element being searched. For example, a street name may include alphanumeric elements and/or numerical characters (e.g., 5th Avenue), so the alphanumeric filters shown at 507 and/or 535 may be omitted, in some implementations, for street identification.

The SAP may set a most probable element of the input address array for the particular type of data being searched as the current element under consideration 501. For example, addresses often have a state designation near the end of the address string. Accordingly, for a state search, the SAP may find that the most probable element is the last element of the input address array and begin its search with this element. In one implementation, the most probable element for a given type of data may be stored in association with that type of data in a database queried by the SAP. The SAP may then check the contents of the current element under consideration 504, for example to make sure that the contents exist and that the element is not empty, that the contents have an expected format, to place the contents into a cache memory, and/or the like. A determination may be made as to whether the contents of the current element are alphamumeric 507. If so, the SAP may undertake an error handling procedure, mark the input address string as a bad address, supply an error message, move the current element to the next element of the input address array, and/or the like 510. This determination may be appropriate, for example, for data types where an alphanumeric value is unlikely (e.g., state, city). The SAP may compare the contents of the current element of the input address array to cached data of the data type under consideration, such as state, city, street, and/or the like 513. In one implementation, the comparison of input address array contents to stored and/or cached database contents may be achieved via a structured query language (SQL) Select statement specifying one or more search inputs and one or more tables. A determination is made as to whether a match exists 517 between the array contents and any of the cached data. If so, the input array element is marked as matching the data and/or marked as the matching data type (e.g., labeled as a state), and is dropped from the input address array 520. Otherwise, if no match is initially found, the SAP may attempt a approximate match, comparing the array contents to alternate names, known misspellings, variants, abbreviations, and/or the like stored in association with elements of the cached data 523. A determination is made as to whether a approximate match has been established 526. If so, the array contents are marked as matching the data and/or data type and the element is dropped from the array 520. Otherwise, the SAP may initialize a counter 529 and combine the contents of the current element under consideration with the contents of the array element right before it 532 to yield a new current element. For example, if the original array reads "154, new york", the search through 526 would be on "york", but at 532 the SAP would append "new" to begin searching on "new york." A determination may be made as to whether the contents of the current element are alphanumeric 535 and, if so, the SAP may undertake an error handling procedure, mark the input address string as a bad address, supply an error message, and/or the like 538. The SAP may compare the contents of the current element to the cached data of the data type under consideration 541, and a determination may be made as to whether a match exists 544 between the array contents and any of the cached data. If so, the input array element is marked as matching the data and/or marked as the matching data type and is dropped from the input address array 547. Otherwise, if no match is initially found, the SAP may attempt a approximate match 550, and a determination may be made as to whether a approximate match has been established 553. If so, the array contents are marked as matching the data and/or data type and the element is dropped from the array 547. Otherwise, a determination may be made as to whether the counter variable has exceeded a maximum limit. In one implementation, the maximum may be set to five. If the maximum has not yet been reached, the SAP may increment the counter 559, and append the element preceding the last appended element in the input address array to the current element to yield a new current element 541 (e.g., "154 new york" in the example discussed above). Once the counter has reached the maximum value at 556, a determination may be made a to whether there are any remaining initial elements to check in the input address array 562 (e.g., elements that have not yet been considered on their own or as the first element of a serially telescoping search such as that beginning at 541). If there are remaining elements, the SAP may set the next element in the array (e.g., the previous element sequentially in the array) as the current element under consideration 563, and return to 504. Otherwise, if no mat is found and there are no elements remaining to be checked at 562, an error handling procedure may be undertaken, the string may be marked as a bad address string, an error message may be generated, and/or the like 565. In some implementations, the lack of a particular address element type in an input string may be permissible, and thus no error handling will be undertaken if that address element type is not found in the input address array.

Figure 6:
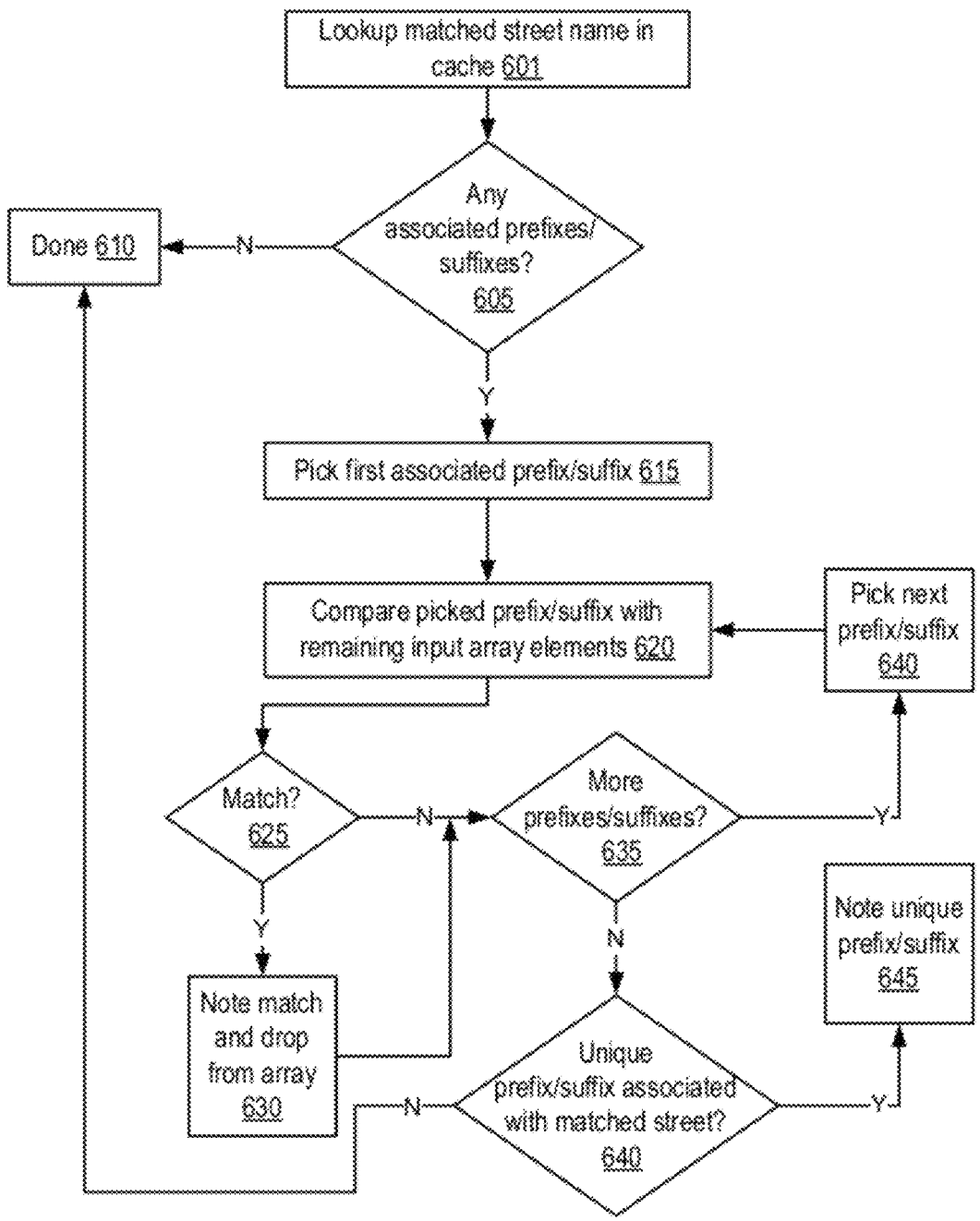
FIG. 6 shows an implementation of logic flow for street prefix/suffix identification in one embodiment of SAP operation.

FIG. 6 shows an implementation of logic flow for street prefix/suffix identification in one embodiment of SAP operation. The SAP may lookup a street name, matched from the input address string such as via a serially telescoping search, in a database and/or cached data 601 to determine if there are any associated prefixes and/or suffixes 605. If there are no suffixes or prefixes associated with the street name, then the SAP is done with the prefix/suffix matching 610. Otherwise, the SAP may pick the first associated prefix and/or suffix associated with the street name 615 and compare it to input array elements remaining after the search and drop procedures described with reference to FIG. 5, such as by performing a sequential comparison against each remaining element 620. A determination may be made as to whether a match is found 625 and, if so, the matching prefix and/or suffix may be noted and dropped from the array 630. The SAP may determine if there are additional prefixes and/or suffixes associated with the identified street name 635 and, if so, then the next prefix and/or suffix may be picked 640 for comparison with remaining input array elements 620. Otherwise, the SAP may determine whether the prefix and/or suffix matched to the identified street name is unique 640. If so, the unique matching prefix may be noted 645. In one implementation, a determination may be made as to whether the unique prefix and/or suffix was already noted at 630, in which case it may not be noted again at 645. In another implementation, if the prefix and/or suffix noted at 630 is incomplete or otherwise differs from the stored unique prefix and/or suffix associated with the identified street name, the noted prefix and/or suffix may be supplemented, corrected, and/or otherwise adjusted to bring it into conformance with the stored prefix and/or suffix values at 645. If there are determined to be more than one unique prefix and/or suffix associated with the identified street name at 640, the SAP may forgo a unique assignment of prefix and/or suffix to the input address array and may exist the flow 610.

Figure 7:
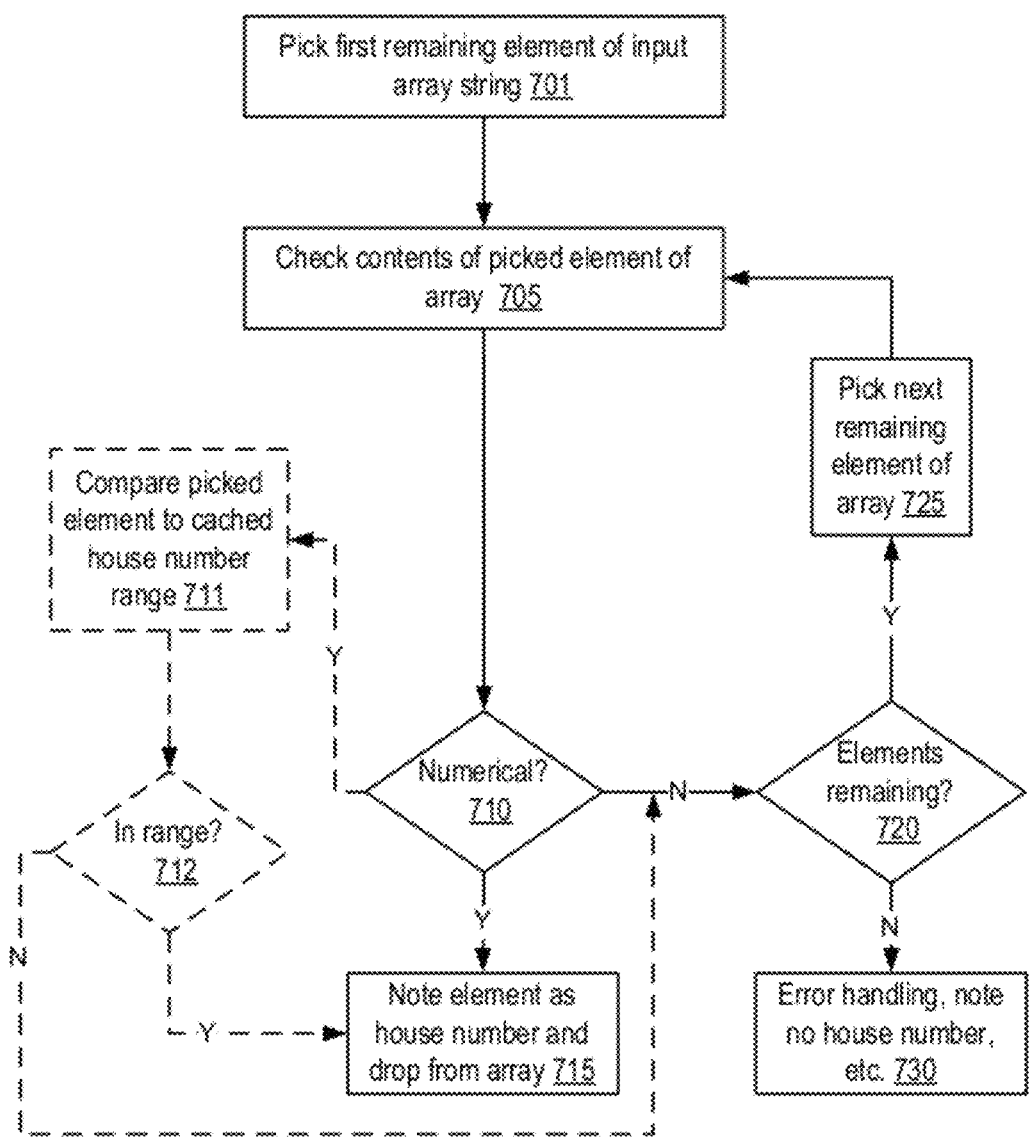
FIG. 7 shows an implementation of logic flow for house number identification in one embodiment of SAP operation.

FIG. 7 shows an implementation of logic flow for house number identification in one embodiment of SAP operation. The SAP may pick a first remaining element of the input array 701. In one implementation, the SAP may begin by picking another element of the input array, such as one designated as a most probable element for the house number (which may, in one implementation, be designated as the first element of the array). The SAP may then check the contents of the picked element of the array 705 to determine if they are numerical 710. If so, in one implementation, the SAP may note the element as the house number and drop it from the array. In an alternative, implementation, the SAP may first compare the contents of the input array element with a cached house number range associated with other previously identified address elements, such as street name, city, state, and/or the like 711. A determination may be made as to whether the input address array element contents are in the cached house number range 712. If so, then the contents may be noted as the house number and dropped from the array 715. If either the element is not numerical at 710 or the element is not in range at 712, then the SAP may determine whether there are unchecked elements remaining in the input address array 720. If so, then the next remaining element may be picked 725 and checked 705. Otherwise, an error handling procedure may be undertaken, a lack of house number may be noted, and/or the like 730.

Figure 8:
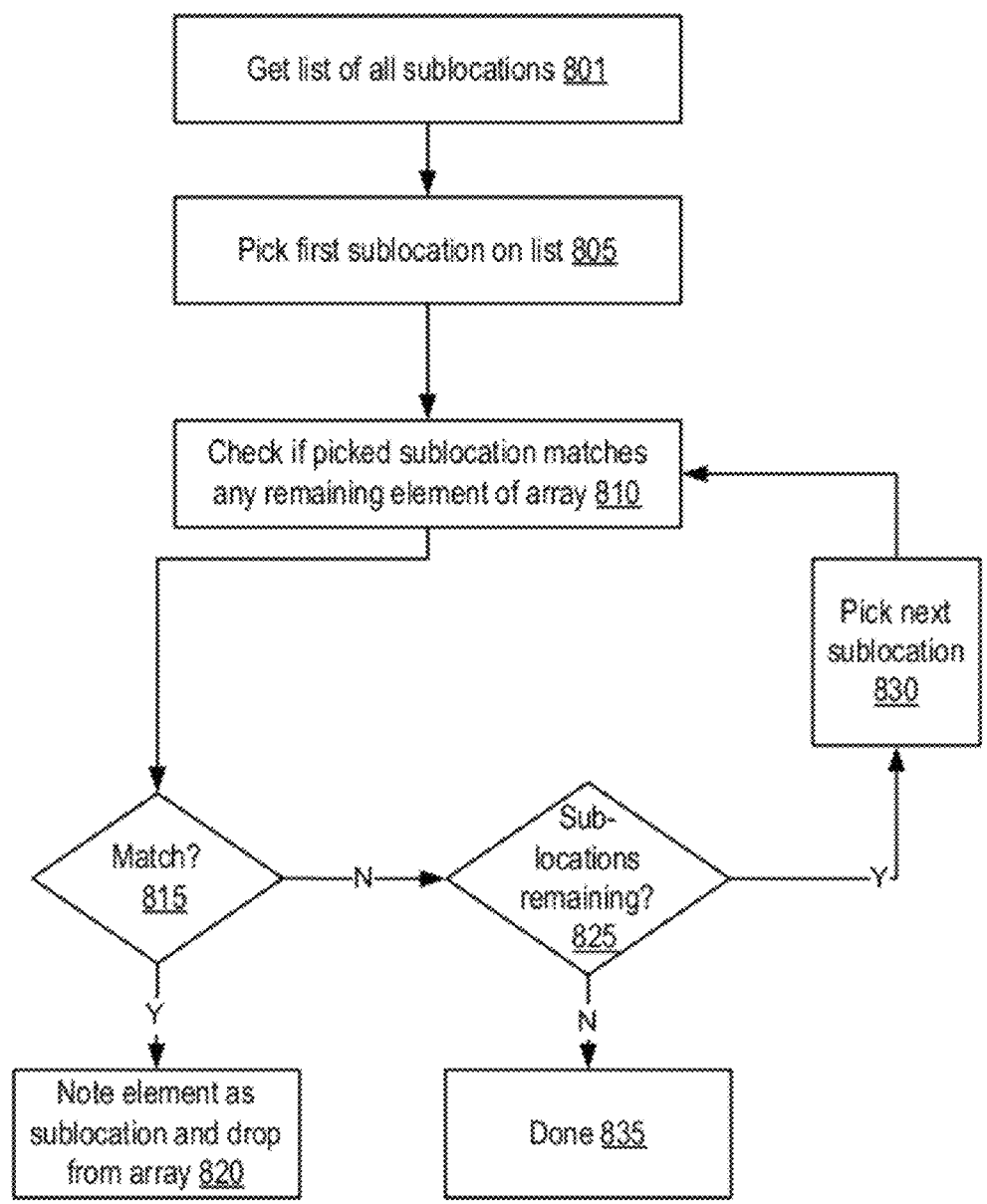
FIG. 8 shows an implementation of logic flow for sublocation identification in one embodiment of SAP operation.

FIG. 8 shows an implementation of logic flow for sublocation identification in one embodiment of SAP operation. The SAP may get a list of all sublocations 801 from a database and/or a cached list of sublocations. In one implementation the SAP may access the same list of all possible sublocations for each input address array analysis. In an alternative implementation, the SAP may access a custom list that is associated with other previously identified address elements, such as an identified street, city, state, and/or the like. For example, if a particular street in a particular city in a particular state is known to have no apartments, then the SAP may access a custom sublocation list that does not include sublocation possibilities such as "apartment" or "apt." The SAP may pick a first sublocation from the accessed list 805 and check if the picked sublocation matches any of the remaining elements of the input address array 810, such as by sequentially comparing the sublocation with each element of the array. A determination may be made as to whether any match has been found 815 and, if so, the element my be noted as a sublocation and dropped form the array 820. Otherwise, if no match is found, the SAP may determine if there are further sublocations remaining to compare with the input address array 825. If so, the next sublocation is picked 830 and checked against the elements of the array 810. Otherwise, the SAP may be done searching for sublocations within the input address array 835.

In various implementations, parsed address elements may be stored in a structured list or table; provided for display on a display screen and/or a printed report; provided to a word processing application for incorporation into a document; printed onto an address label, envelope, and/or the like; used to determine a distance between two locations, postage fees, and/or the like; provided to a mapping application, map generation website, and/or the like; provided to a services listing to find nearby services such as shops, restaurants, tourist sights, hospitals, police stations, fire stations, government buildings, and/or other facilities; provided to a directory to look up address-associated information, such as a phone number, an individual's or business' name, an electronic address, and/or the like; and/or the like.

In some implementations, the SAP may remember aspects of input address string analyses and use those aspects for subsequent input address string analyses. For example, the SAP may keep track of the location of one or more address elements in a sequence of input address arrays and set the most commonly occurring location in that sequence as the most_probable_element for that address element in future searches (e.g., if the city element is found as the second to last element of the majority of instances in a sequence of input address arrays, the SAP may first look to the second to last element of the input address array for subsequent city analyses). In one implementation, the memory may be temporary and/or only applicable to a set number of future analyses, a set sequence of input address strings, and/or otherwise limited.

SAP Controller

Figure 9:
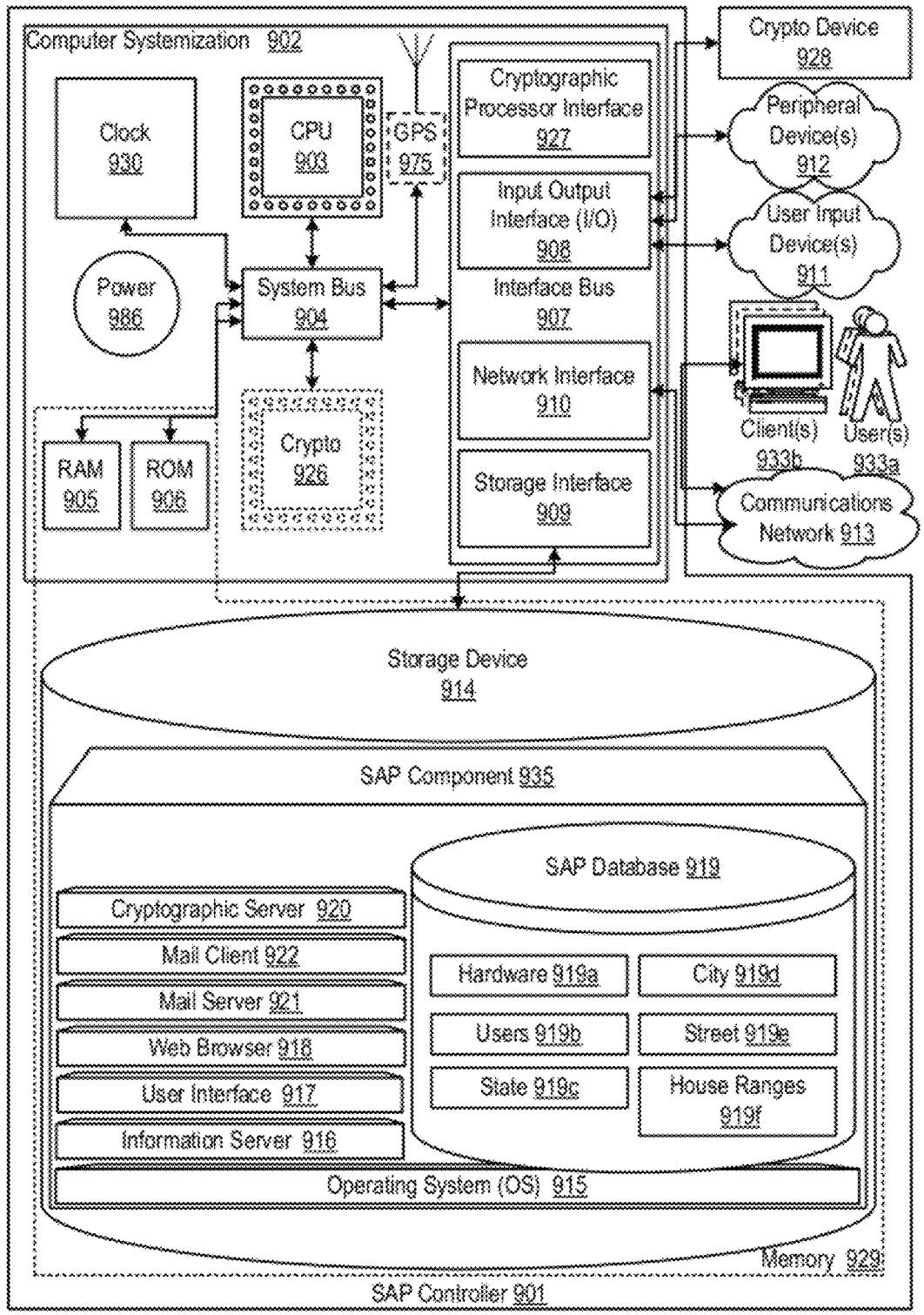
FIG. 9 is of a block diagram illustrating embodiments of the SAP controller.

FIG. 9 illustrates inventive aspects of a SAP controller 901 in a block diagram. In this embodiment, the SAP controller 901 may serve to aggregate, process, store, search, serve, identify, instruct, generate, match, and/or facilitate interactions with a computer through parsing technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass signals acting as instructions to enable various operations. These instructions may be operational and/or data instructions containing and/or referencing other instructions and data in various processor accessible and operable areas of memory 929 (e.g., registers, cache memory, random access memory, etc.). Such communicative signals or instructions may be stored and/or transmitted in batches (e.g., batches of instructions) as programs and/or data components to facilitate desired operations. These stored instruction code signals, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SAP controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SAP controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions and/or signals may travel to effect communications, operations, storage, etc. Optionally, the computer systemization may be connected to an internal power source 986. Optionally, a cryptographic processor 926 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through signal passing through conductive and/or transportive conduits (e.g., (printed) electronic and/or optic circuits) to execute stored signal instructions (i.e., program code) according to conventional data processing techniques. Such signal passing facilitates communication within the SAP controller and beyond through various interfaces. Should processing requirements dictate a greater amount speed and/or capacity, distributed processors (e.g., Distributed SAP), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the SAP may be achieved by implementing a microcontroller such as CAST's R8051XC2 microcontroller; Intel's MCS 51 (i.e., 8051 microcontroller); and/or the like. Also, to implement certain features of the SAP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SAP component collection (distributed or otherwise) and/or features may be implemented via the microprocessor and/or via embedded components; e.g., via ASIC, coprocessor, DSP, FPGA, and/or the like. Alternately, some implementations of the SAP may be implemented with embedded components that are configured and used to achieve a variety of features or signal processing.

Depending on the particular implementation, the embedded components may include software solutions, hardware solutions, and/or some combination of both hardware/software solutions. For example, SAP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SAP features. A hierarchy of programmable interconnects allow logic blocks to be interconnected as needed by the SAP system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the SAP may be developed on regular FPGAs and then migrated into a fixed version that more resembles ASIC implementations. Alternate or coordinating implementations may migrate SAP controller features to a final ASIC instead of or in addition to FPGAs. Depending on the implementation all of the aforementioned embedded components and microprocessors may be considered the "CPU" and/or "processor" for the SAP.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the SAP thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the SAP controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SAP), architectures may similarly be employed to pool, load balance, and/or otherwise increase the communicative bandwidth required by the SAP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the SAP controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the SAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the SAP controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the SAP component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the SAP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/ 3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SAP controller to communicate with other entities through a communications network 913. Various communication protocols may be used by the SAP controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SAP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SAP database 919, operating systems, other program components, user interfaces, Web browsers, and/or the like.

Access to the SAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the SAP enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SAP.

Access to the SAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Crypto graphic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SAP component to engage in secure transactions if so desired. The cryptographic component facilitates the secure accessing of resources on the SAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SAP Database

The SAP database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SAP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the SAP database is implemented as a data-structure, the use of the SAP database 919 may be integrated into another component such as the SAP component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-f*. A hardware table 919*a* includes fields such as, but not limited to: hardware_ID, hardware_type, hardware_name, data_formatting_requirements, protocols, addressing_info, usage_history, Hardware_requirements, user_ID and/or the like including but not limited to devices for input and output. The user table 419*b* may support and/or track multiple entity accounts on a SAP. It can include fields such as, but not limited to: user_ID, user_name, contact_info, hardware_ID, mobile_device_type and/or the like. A State table 919*c* may include fields such as, but not limited to: state_ID, state_name, alternate_state_name(s), state_abbreviation(s), state_misspelling(s), most_probable_state_element, and/or the like. A City table 919*d* may include fields such as, but not limited to: city_ID, city_name, alternate_city_name(s), city_abbreviation(s), city_misspelling(s), state_ID(s), most_probable_city_element, and/or the like. A Street table 919*e* may include fields such as, but not limited to: street_ID, street_name, alternate_street_name(s), street_abbreviation(s), street_misspelling(s), prefix(es), suffix(es), state_ID(s), city_ID(s), most_probable_street_element, and/or the like. A House Ranges table 919*f* may include fields such as, but not limited to: house_range_ID, street_ID (s), city_ID(s), state_ID(s), house_range(s), sublocation(s), and/or the like.

In one embodiment, the SAP database may interact with other database systems. For example, employing a distributed database system, queries and data access by search SAP component may treat the combination of the SAP database, an integrated data security layer database as a single database entity.

In one embodiment, user programs may contain various user interface primitives, which may serve to update the SAP. Also, various accounts may require custom database tables depending upon the environments and the types of clients the SAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-f*. The SAP may be configured to keep track of various settings, inputs, and parameters via database controllers.

The SAP database may communicate to and/or with other components in a component collection, including itself, and/or facilities of the like. Most frequently, the SAP database communicates with the SAP component, other program components, and/or the like. The database may contain, retain, and provide information regarding other nodes and data.

The SAP Component

The SAP component 935 is a stored program component that is executed by a CPU. In one embodiment, the SAP component incorporates any and/or all combinations of the aspects of the SAP that was discussed in the previous figures. As such, the SAP affects accessing, obtaining and the provision of information, services, transactions, and/or the like across various communications networks.

The SAP component enables the searching, storing, sorting, comparing, accessing, generating, identifying issuing, instructing, matching, processing, facilitating and/or the like of input text and/or address information, stored address information, and/or the like and use of the SAP.

The SAP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SAP server employs a cryptographic server to encrypt and decrypt communications. The SAP component may communicate to and/or with other components in a component collection, including itself, and/or facilities of the like. Most frequently, the SAP component communicates with the SAP database, operating systems, other program components, and/or the like. The SAP may contain, communicate, generate, obtain, and/or provide program component, system, user, and/or data communications, requests, and/or responses.

Distributed SAPs

The structure and/or operation of any of the SAP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/ or other aspects of the disclosure are not to be considered limitations on the disclosure as defined by the claims or limitations on equivalents to the claims.

What is claimed is:

1. An address-parsing processor-implemented method, comprising:
reading a list of states, including corresponding state variants, from a state database into a cached state array;
receiving an input address string;
trimming spaces from ends of the input address string;
replacing each instance of punctuation in the input address string with a space;
replacing each instance of multiple adjacent spaces in the input address string with a single space;
splitting the input address string by the single space delimiters into a plurality of address components;
associating each of the plurality of address components with an element of an input address array;
locating at least one input address array state element corresponding to a matching state from the cached state array by a serially telescoping state search;
recording the matching state;
dropping the at least one input address array state element from the input address array;
reading a list of cities associated with the matching state, including corresponding city variants, into a cached city array;
locating at least one input address array city element corresponding to a matching city from the cached city array by a serially telescoping city search;
recording the matching city;
dropping the at least one input address array city element from the input address array;
reading a list of streets associated with the matching city and the matching state, including corresponding street variants, into a cached street array;
locating at least one input address array street element corresponding to a matching street from the cached street array by a serially telescoping street search;
recording the matching street;
dropping the at least one input address array street element from the input address array;
reading a list of street prefixes and street suffixes associated with the matching street into the cache;
comparing the list of street prefixes and street suffixes with the input address array to identify any matching street prefixes and street suffixes;
searching the input address array for a numerical element;
recording the numerical element as a house address;
dropping the numerical element from the input address array; and
providing the matching state, matching city, matching street, and the house address.

2. An address-parsing apparatus, comprising:
a memory;
a processor disposed in communication with the memory, and configured to issue a plurality of processing instructions stored in the memory, wherein the instructions include:
read a list of states, including corresponding state variants, from a state database into a cached state array;
receive an input address string;
trim spaces from ends of the input address string;
replace each instance of punctuation in the input address string with a space;
replace each instance of multiple adjacent spaces in the input address string with a single space;
split the input address string by the single space delimiters into a plurality of address components;
associate each of the plurality of address components with an element of an input address array;
locate at least one input address array state element corresponding to a matching state from the cached state array by a serially telescoping state search;
record the matching state;
drop the at least one input address array state element from the input address array;
read list of cities associated with the matching state, including corresponding city variants, into a cached city array;
locate at least one input address array city element corresponding to a matching city from the cached city array by a serially telescoping city search;
record the matching city;
drop the at least one input address array city element from the input address array;
read a list of streets associated with the matching city and the matching state, including corresponding street variants, into a cached street array;
locate at least one input address array street element corresponding to a matching street from the cached street array by a serially telescoping street search;
record the matching street;
drop the at least one input address array street element from the input address array;
read a list of street prefixes and street suffixes associated with the matching street into the cache;
compare the list of street prefixes and street suffixes with the input address array to identify any matching street prefixes and street suffixes;
search the input address array for a numerical element;
record the numerical element as a house address;
drop the numerical element from the input address array; and
provide the matching state, matching city, matching street, and the house address.

3. An address-parsing processor-accessible non-transitory medium, comprising:
a plurality of processor-issuable instructions, wherein the instructions include:
read a list of states, including corresponding state variants, from a state database into a cached state array;
receive an input address string;
trim spaces from ends of the input address string;
replace each instance of punctuation in the input address string with a space;
replace each instance of multiple adjacent spaces in the input address string with a single space;
split the input address string by the single space delimiters into a plurality of address components;
associate each of the plurality of address components with an element of an input address array;
locate at least one input address array state element corresponding to a matching state from the cached state array by a serially telescoping state search;
record the matching state;
drop the at least one input address array state element from the input address array;
read list of cities associated with the matching state, including corresponding city variants, into a cached city array;
locate at least one input address array city element corresponding to a matching city from the cached city array by a serially telescoping city search;

record the matching city;
drop the at least one input address array city element from the input address array;
read a list of streets associated with the matching city and the matching state, including corresponding street variants, into a cached street array;
locate at least one input address array street element corresponding to a matching street from the cached street array by a serially telescoping street search;
record the matching street;
drop the at least one input address array street element from the input address array;
read a list of street prefixes and street suffixes associated with the matching street into the cache;
compare the list of street prefixes and street suffixes with the input address array to identify any matching street prefixes and street suffixes;
search the input address array for a numerical element;
record the numerical element as a house address;
drop the numerical element from the input address array; and
provide the matching state, matching city, matching street, and the house address.

* * * * *